United States Patent
Cook et al.

(10) Patent No.: US 11,138,377 B2
(45) Date of Patent: Oct. 5, 2021

(54) AUTOMATED DOCUMENT ANALYSIS COMPRISING COMPANY NAME RECOGNITION

(71) Applicant: Freedom Solutions Group, LLC, Dowers Grove, IL (US)

(72) Inventors: David A. Cook, Barrington, IL (US); Andrzej H. Jachowicz, Tower Lakes, IL (US); Phillip Karl Jones, Bartlett, IL (US)

(73) Assignee: Freedin Solutions Group, LLC, Downers Grove, IL (US)

( * ) Notice: Subject to any disclaimer, the term of this patent is extended or adjusted under 35 U.S.C. 154(b) by 0 days.

(21) Appl. No.: 16/730,122

(22) Filed: Dec. 30, 2019

(65) Prior Publication Data

US 2020/0134261 A1     Apr. 30, 2020

Related U.S. Application Data

(63) Continuation of application No. 16/375,845, filed on Apr. 4, 2019, now Pat. No. 10,558,755, which is a
(Continued)

(51) Int. Cl.
*G06F 40/295* (2020.01)
*G06F 40/30* (2020.01)
(Continued)

(52) U.S. Cl.
CPC .......... *G06F 40/295* (2020.01); *G06F 3/0481* (2013.01); *G06F 40/205* (2020.01);
(Continued)

(58) Field of Classification Search
USPC .................................................. 704/1–504
See application file for complete search history.

(56) References Cited

U.S. PATENT DOCUMENTS

| | | | |
|---|---|---|---|
| 5,632,002 A * | 5/1997 | Hashimoto | G06F 3/165 704/231 |
| 5,966,710 A | 10/1999 | Burrows | |

(Continued)

OTHER PUBLICATIONS

Z. Kozareva, "Boostrapping named entity recognition with automatically generated gazetteer lists," Proceedings of the Eleventh Conference of the European Chapter of the Association for Computer Linguistics: Student Research Workshop (EACL '06), Torino, Italy, Apr. 6, 2006, pp. 15-21.
(Continued)

*Primary Examiner* — Marcus T Riley
(74) *Attorney, Agent, or Firm* — Nixon Peabody LLP

(57) ABSTRACT

At least two processing device-implemented company name recognition components, operating upon a body of text in a document, identify at least one company name occurrence in the body of text based at least in part on a company identifier list. The company name recognition techniques implemented by each of the at least two company name recognition components are different from each other. The at least one company name occurrence is used to update the company identifier list. The updated company identifier list is then used by the at least two company name recognition components to identify at least one additional name occurrence in the same body of text. This process of repeatedly identifying occurrences of company names in the body of text and updating the company identifier list is performed until such time that no further company name occurrences are identified in the body of text.

20 Claims, 7 Drawing Sheets

Related U.S. Application Data continuation of application No. 15/249,374, filed on Aug. 27, 2016, now Pat. No. 10,255,270.

(60) Provisional application No. 62/211,097, filed on Aug. 28, 2015.

(51) Int. Cl.

| | | |
|---|---|---|
| *G06F 40/40* | (2020.01) | |
| *G06F 40/205* | (2020.01) | |
| *G06F 40/232* | (2020.01) | |
| *G06F 40/247* | (2020.01) | |
| *G06F 40/284* | (2020.01) | |
| *G06F 40/289* | (2020.01) | |
| *G06F 3/0481* | (2013.01) | |
| *G06F 40/253* | (2020.01) | |
| *G06F 40/106* | (2020.01) | |

(52) U.S. Cl.
CPC .......... *G06F 40/232* (2020.01); *G06F 40/247* (2020.01); *G06F 40/284* (2020.01); *G06F 40/289* (2020.01); *G06F 40/30* (2020.01); *G06F 40/40* (2020.01); *G06F 40/106* (2020.01); *G06F 40/253* (2020.01)

(56) References Cited

U.S. PATENT DOCUMENTS

| | | | | |
|---|---|---|---|---|
| 6,601,233 | B1 | 7/2003 | Underwood | |
| 7,415,617 | B2* | 8/2008 | Ginter | H04L 9/3263 |
| | | | | 348/E5.006 |
| 7,849,081 | B1* | 12/2010 | Chang | G06F 16/345 |
| | | | | 707/727 |
| 8,280,719 | B2* | 10/2012 | Miller | G06F 40/295 |
| | | | | 704/9 |
| 8,423,563 | B2* | 4/2013 | McPeake | G06F 16/90344 |
| | | | | 707/758 |
| 8,504,492 | B2 | 8/2013 | Ghani et al. | |
| 8,675,884 | B2* | 3/2014 | Yehuday | H04R 1/1083 |
| | | | | 381/71.6 |
| 8,855,328 | B2* | 10/2014 | Arie | H04R 5/04 |
| | | | | 381/71.11 |
| 9,779,363 | B1 | 10/2017 | Hansen et al. | |
| 9,779,388 | B1 | 10/2017 | Hansen et al. | |
| 10,255,270 | B2* | 4/2019 | Cook | G06F 40/295 |
| 10,387,569 | B2 | 8/2019 | Cook et al. | |
| 10,558,755 | B2* | 2/2020 | Cook | G06F 40/284 |
| 2005/0060584 | A1* | 3/2005 | Ginter | H04N 21/8355 |
| | | | | 726/4 |
| 2005/0084152 | A1* | 4/2005 | McPeake | G06F 16/90344 |
| | | | | 382/173 |
| 2007/0230787 | A1* | 10/2007 | Belitskaya | G06K 9/723 |
| | | | | 382/182 |
| 2008/0249764 | A1* | 10/2008 | Huang | G06F 40/30 |
| | | | | 704/9 |
| 2011/0119576 | A1* | 5/2011 | Aumann | G06F 40/16 |
| | | | | 715/255 |
| 2012/0011426 | A1 | 1/2012 | Yach | |
| 2012/0095993 | A1* | 4/2012 | Shau | G06F 16/334 |
| | | | | 707/723 |
| 2016/0103885 | A1* | 4/2016 | Lee | G06F 16/3334 |
| | | | | 707/739 |
| 2016/0140643 | A1* | 5/2016 | Nice | G06F 16/3344 |
| | | | | 705/26.7 |
| 2017/0060833 | A1 | 3/2017 | Cook et al. | |
| 2017/0060836 | A1* | 3/2017 | Cook | G06F 40/295 |
| 2017/0060843 | A1* | 3/2017 | Cook | G06F 40/30 |
| 2018/0165554 | A1* | 6/2018 | Zhang | G06K 9/6256 |
| 2019/0236133 | A1* | 8/2019 | Cook | G06F 40/289 |
| 2020/0134261 | A1* | 4/2020 | Cook | G06F 40/232 |

OTHER PUBLICATIONS

A. Carlson et al., "Learning a Named Entity Tagger from Gazetteers with the Partial Perceptron," AAAI Spring Symposium: Learning by Reading and Learning to Read, Palo Alto, California, USA, Mar. 23, 2009, pp. 7-13.

International Preliminary Report on Patentability for International Application No. PCT/US2016/049165, dated Mar. 6, 2018, 8 pages.

* cited by examiner

AUTOMATED DOCUMENT ANALYSIS COMPRISING COMPANY NAME RECOGNITION

CROSS-REFERENCE TO RELATED APPLICATION

The instant application claims the benefit of Provisional U.S. Patent Application Ser. No. 62/211,097 entitled "USER INTERFACE INCORPORATING DISCOVERY OF COMPANY NAMES IN A DOCUMENT" and filed Aug. 28, 2015, the teachings of which are incorporated herein by this reference.

Additionally, the instant application is related to co-pending applications entitled "AUTOMATED DOCUMENT ANALYSIS COMPRISING A USER INTERFACE BASED ON CONTENT TYPES" (U.S. application Ser. No. 15/249,377) and "MITIGATION OF CONFLICTS BETWEEN CONTENT MATCHERS IN AUTOMATED DOCUMENT ANALYSIS" £U.S. application Ser. No. 15/249,379), filed on even date herewith, the teachings of which are incorporated herein by this reference.

FIELD

The instant disclosure relates generally to devices that perform automated document analysis and, in particular, to performance of company name recognition by such devices.

BACKGROUND

Devices, typically suitable programmed computing devices, that perform automated document analysis are well known in the art. Examples of products that perform automated document analysis include Early Case Assessment software provided by Complete Discovery Source, Inc., Redact-It software by Open Text Corp, Intelligent Data Extraction software by Extract Systems and automated redaction software by Adlibs Software. Among other features, some of these products perform company name recognition analysis and provide enhanced man-machine user interfaces in which the occurrence of company names in document text are displayed and highlighted. Ideally, the processing performed to implement such company name recognition analysis will lead to few, if any, false positives and few false negatives (misses) that would otherwise lead to an inaccurate representation of the document text presented by such user interfaces. However, this is not always the case.

Various machine-implemented techniques for performing company name recognition analysis are known in the art. For example, the analysis devices may be equipped with a predefined lists of company names and perform simple comparisons to identify occurrence of matches to entries in the predefined list. However, such predefined lists are invariably incomplete and, in any event, constantly changing due to companies changing names, new companies coming into existence, old names falling into disuse, etc. Consequently, company name recognition analysis that relies solely on list-based comparisons tend to be relatively inaccurate.

In another technique, the analysis device identifies as names all capitalized words in the text that do not start sentences, that are found in a dictionary or that are found in a list of people names. However, extracting all capitalized words meeting these criteria results in many false positives for company names to the extent that various other names (e.g., product names, professional/legal terms, etc.) are likely to be identified as company names, as well as many false negatives because companies are often named for people or things, and often start sentences (e.g., "Apple shall . . .").

Further still, regular expression pattern matching is a well-known technique for recognizing the occurrence of well-defined patterns in text. Consequently, pattern recognition techniques generally work well for recognizing phone numbers, currencies, and social security numbers, for example, but do not fare well with company names that do not always follow a well-defined letter/digit sequence and are often used inconsistently (e.g., shortened) even within a single document. While it may be possible to design a regular expression that could work for company names in some instances, the resulting regular expression would likely be unwieldy and poor performing.

Thus, techniques and devices that overcome the operational shortcomings of prior art devices/products and improve operation of the man-machine interface (to at least the extent that less errors are presented) would represent a welcome advancement in the art.

SUMMARY

In an embodiment, at least two processing device-implemented company name recognition components, operating upon a body of text in a document, identify at least one company name occurrence in the body of text based at least in part on a company identifier list. The company name recognition techniques implemented by each of the at least two company name recognition components are different from each other, i.e., the at least two company name recognition components perform company name recognition in different ways from each other. The at least one company name occurrence is used to update the company identifier list to provide an updated company identifier list. In turn, the updated company identifier list is then used, in part, by the at least two company name recognition components to identify at least one additional name occurrence in the same body of text. This process of repeatedly identifying occurrences of company names in the body of text and updating the company identifier list is performed until such time that no further company name occurrences are identified in the body of text.

In various embodiments, the techniques implemented by the at least two company name recognition components may be based on matching portions of the body of text with company names in the company identifier list, identifying portions of the body of text that often precede a company name, identifying portions of the body of text that often follow a company name or combinations thereof. Further still, these various techniques may be performed in a desired order. Updates to the company identifier list may include shortened forms of the at least one company name occurrence. Further still, company name occurrences thus identified may be excluded to the extent that they find a match in an excluded company name list.

In an embodiment, a user interface is provided that includes a representation of the at least one company name occurrence or the at least one additional company name occurrence. In particular, a portion of the body of text may be displayed along with indicia corresponding to the at least one company name occurrence or the at least one additional company name occurrence within the displayed body of text.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Figure 1:
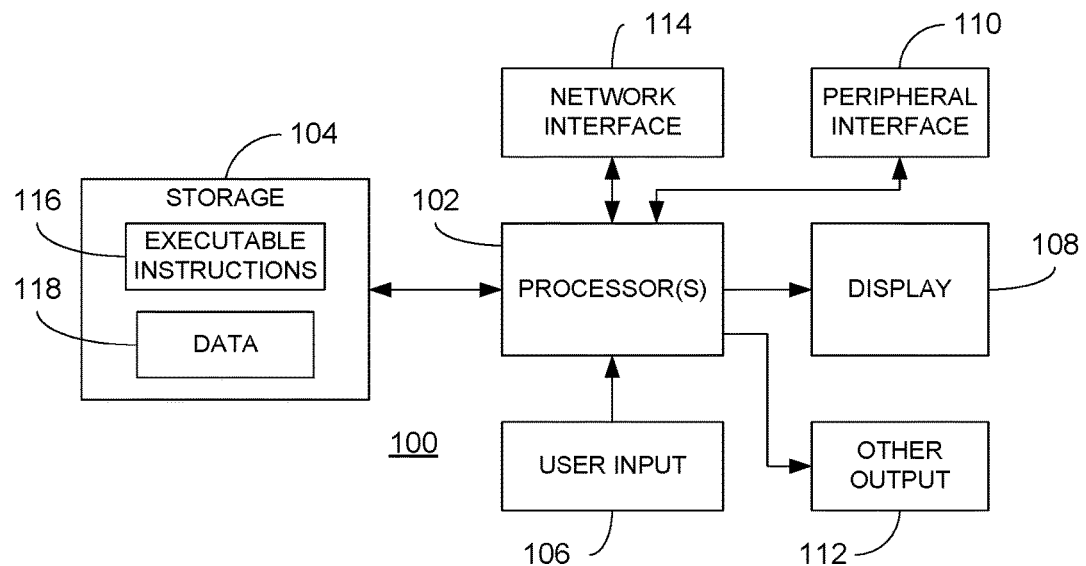
FIG. 1 is a block diagram of a processing device that may be used to implement various embodiments in accordance with the instant disclosure.

Referring now to FIG. 1, a representative device or machine 100 that may be used to implement the teachings of the instant disclosure is illustrated. The device 100, which may be embodied by, for example, a desktop, laptop or handheld computer, server computer or the like, may be used to implement one or more company name recognition components (CNRCs) and perform the processing described in greater detail below. Regardless, the device 100 comprises at least one processing device 102 coupled to a storage component or memory 104. The storage component 104, in turn, comprises stored executable instructions 116 and data 118. In an embodiment, the processor 102 may comprise one or more of a microprocessor, microcontroller, digital signal processor, co-processor or the like or combinations thereof capable of executing the stored instructions 116 and operating upon the stored data 118. Likewise, the storage component 104 may comprise one or more devices such as volatile or nonvolatile memory including but not limited to random access memory (RAM) or read only memory (ROM). Further still, the storage component 104 may be embodied in a variety of forms, such as a hard drive, optical disc drive, floppy disc drive, network-based storage, etc. Processor and storage arrangements of the types illustrated in FIG. 1 are well known to those having ordinary skill in the art. In one embodiment, the processing techniques described herein are implemented as a combination of executable instructions and data within the storage component 104. For example, the stored data 118 may comprise, a company identifier list, excluded company name list or other data described below.

As shown, the device 100 may comprise one or more user input devices 106, a display 108, a peripheral interface 110, other output devices 112 and a network interface 114 in communication with the at least one processing device 102. The user input device 106 may comprise any mechanism for providing user input (such as inputs specifying a document to be analyzed) to the processor 102. For example, the user input device 106 may comprise a keyboard, a mouse, a touch screen, microphone and suitable voice recognition application or any other means whereby a user of the device 100 may provide input data to the at least one processing device 102. The display 108, may comprise any conventional display mechanism such as a cathode ray tube (CRT), flat panel display, or any other display mechanism known to those having ordinary skill in the art. In an embodiment, the display 108, in conjunction with suitable stored instructions 116, may be used to implement a graphical user interface. Implementation of a graphical user interface in this manner is well known to those having ordinary skill in the art. The peripheral interface 110 may include the hardware, firmware and/or software necessary for communication with various peripheral devices, such as media drives (e.g., magnetic disk or optical disk drives), other processing devices or any other input source used in connection with the instant techniques. Likewise, the other output device(s) 112 may optionally comprise similar media drive mechanisms, other processing devices or other output destinations capable of providing information to a user of the device 100, such as speakers, LEDs, tactile outputs, etc. Finally, the network interface 114 may comprise hardware, firmware and/or software that allows the least one processing device 102 to communicate with other devices via wired or wireless networks, whether local or wide area, private or public, as known in the art. For example, such networks may include the World Wide Web or Internet, or private enterprise networks, as known in the art.

While the device 100 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the device 100 may include a greater or lesser number of components than those illustrated. Once again, those of ordinary skill in the art will appreciate the wide number of variations that may be used is this manner. Further still, although a device 100 is illustrated in FIG. 1, it is understood that a combination of such devices may be configured to operate in conjunction (for example, using known networking techniques) to implement the teachings of the instant disclosure.

Figure 2:
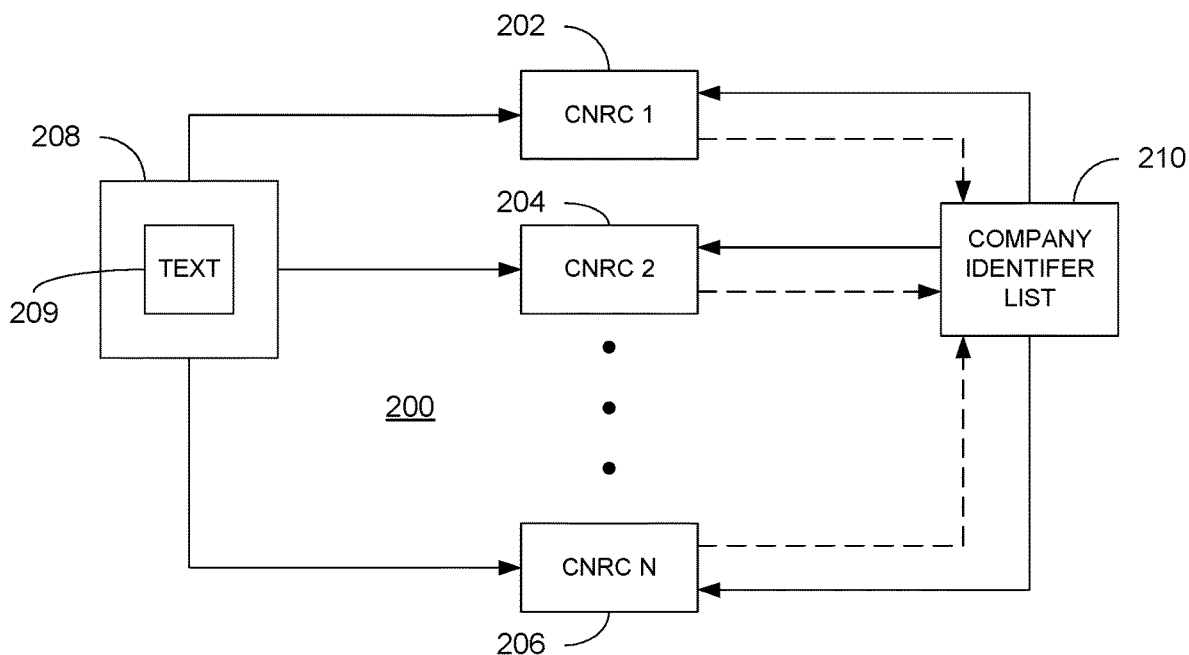
FIG. 2 is a block diagram schematically illustrating a system for performing automated document analysis, particularly name recognition analysis, in accordance with the instant disclosure.

FIG. 2 is a block diagram schematically illustrating a system 200 for performing automated document analysis, particularly name recognition analysis, in accordance with the instant disclosure. As shown, the system 200 comprise at least two CNRCs 202-206; in the illustrated example, N different CNRCs, where N>2, are shown. Each of the CNRCs 202-206 may operate upon a document 208 comprising a body of text 209. Operation of the individual CNRCs 202-206 may be based on a company identifier list 210. In an embodiment, the company identifier list 210 may include various forms of known company names that may be provided in the form of a predetermined and/or user-defined list, e.g., the known names of all publicly traded U.S. and foreign companies or other similar listings. The company identifier list 210 may also include abbreviations, initialisms or other character strings often forming a part of a company name, e.g., "Inc.," "Co.," "GmbH," etc. Further, the company identifier list 210 may include words, phrases or other character strings often forming the context of a company name as set forth in a document, e.g., "d/b/a," "hereafter referred to," etc. Further still, as illustrated by the dotted lines in FIG. 2, occurrences of company names in a document 208 may be used to update the company identifier list, at least as the company identifier list 210 is applied to that document 210.

As used herein, the document 208 may comprise any electronic document in which the individual elements forming the body of text 209 may be accessed, and includes (but is not limited to) document created using any known word processing program, e.g., the "MICROSOFT" Word processing program. While the examples described herein are set forth in the English language, it will be appreciated that the devices and techniques described herein may be equally applied to virtually any language. In fact, as will be appreciated by those having skill in the art, known techniques may be used to split the body of text 209, regardless of the underlying language, into meaningful elements thereof often referred to tokens typically consisting of individual words, but also possibly including phrases (e.g., "et al"), numbers (e.g., "60601"), symbols (e.g., "$"), punctuation (e.g., ","), individual characters or other groupings of characters of such (e.g., "U.S.").

Those having skill in the art will appreciate that various types of "preprocessing" of the document 208 may be performed in accordance with known techniques prior to processing in accordance with the instant disclosure. For example, a tokenizer may operate upon the text 209 in order to identify individual tokens or groups thereof. Further still, a part of speech label (e.g., noun, verb, adjective, etc.) may be assigned to each word or token in the text 209. In an embodiment particularly applicable to company names, roman numerals and superscripted numbers are preprocessed because roman numerals are often part of company names (e.g., Freedom Solutions Holding II), whereas superscripted numbers are not (e.g., Apple Computer3). Further still, in an embodiment, casing of words (i.e., upper case, lower case, mixed cases, capitalized) may also be preprocessed.

In an embodiment, each of the CNRCs 202-206 performs company name recognition analysis base on the body text 209 separately from the other CNRCs. That is, when, for example, the first CNRC 202 is performing company name recognition analysis on the text 209, none of the other CNRCs 204, 206 are allowed to do likewise until the first CNRC 202 has completed its analysis. In another embodiment, operation of the CNRCs 202-206 is ordered so that, for example, the first CNRC 202 completes its processing, followed by the second CNRC 204 and so on through the Nth CNRC 206. Additionally, while each CNRC 202-206 is illustrated as a separate component, the CNRCs 202-206 can incorporate their respective processing into each other so that, for example, the first CNRC 202, while performing its processing, may invoke the processing of the second CNRC 204 as a way to expand upon or improve the results provided by the first CNRC 202.

In one aspect of the instant disclosure, the context of the processing performed by the CNRCs 202-206 is defined by body of text 209. That is, when identifying the occurrence of company names in a document 208, the processing described herein is repeatedly performed on the body of text 209 without further reference to anything learned in performing similar processing in other documents (with the possible exception of a company identifier list 210, as described above). In an embodiment, the process of performing company name recognition analysis by the CNRCs 202-206 and updating the company identifier list 201 is repeated for so long as additional occurrences of company name are identified in the body of text 209. It will be appreciated that this multipass technique for determining that all possible company names in the document 208 have been identified assumes that the body of text 209 remains unchanged throughout this processing. Should any changes be made to the body of text 209, as in the case that edits are made thereto, then one or more cycles of the CNRCs 202-206 would need to be repeated on the edited text until the above-noted termination condition is reached in order to be certain that all possible company names have been identified, as the case may be.

Figure 3:
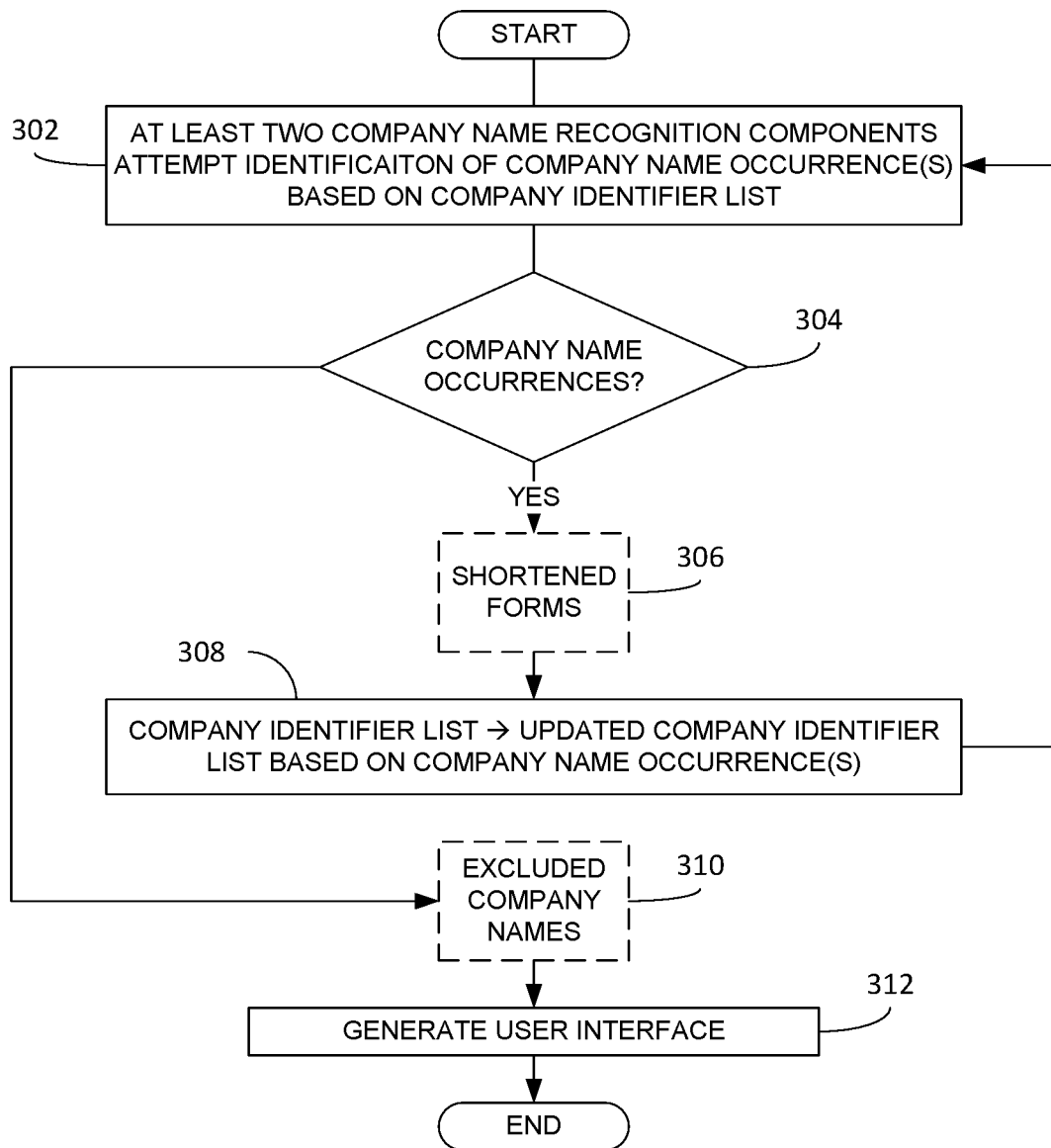
FIG. 3 is a flowchart illustrating an embodiment of processing for automated document analysis in accordance with the instant disclosure.

Referring now to FIG. 3, processing in accordance with an embodiment of the instant disclosure is described. Thus, beginning at block 302 (and presuming that a suitable document 208 has been identified, loaded into memory, preprocessed, etc.), at least two CNRCs perform company name recognition processing on the body of text based at least in part upon the company identifier list. As noted above, each CNRC of the at least two CNRCs implements a company name recognition technique that is different from every other CNRC. Because the results of each CNRC are used to develop additional knowledge concerning company name occurrences in the text, which knowledge is "shared" with the other CNRCs by virtue of updating the company identifier list, having diverse techniques implemented by the respective CNRCs improves the likelihood that all company name occurrences in the document, with few if any false positives or missed company names, will be identified. Various examples of diverse company name recognition techniques are described in greater detail below with reference to FIGS. 4-7. As further noted above, the at least two CNRCs operating at block 302 may be implemented in a desired order.

It is determined at block 304 whether any company names occurrences have been identified as a result of the processing performed at block 302. In an embodiment, the determination of block 304 is performed after each of the at least two CNRCs of block 302 have completed their analysis, though it is possible and may be desirable to allow all of the at least two CNRCs to complete their processing prior to the determination made at block 304. For ease of illustration, FIG. 3 assumes this latter scenario. Regardless, in practice, identification of an occurrence of a company name means that one or more tokens in the text have been categorized as a company name.

Assuming that one or more of the CNRCs executed at block 302 are determined to have identified at least one company name occurrence at block 304, processing may optionally continue at block 306 where shortened forms of each of the at least one company name occurrence may be determined based on well-known techniques. For example, if the first pass by the at least two CNRCs identified a company name occurrence "Brooks Brothers, Inc. Portfolio II America," then the shortened form of "Brooks Brothers" can also be considered a company name for purposes of further processing of the document.

Regardless whether shortened forms are determined at block 306, processing continues at block 308 where the company identifier list most recently used to identify the company name occurrences (as determined at block 304) are used to update the company identifier list to the extent possible. Thus, for example, if a company name not previously found in the list is identified, then that company name is added to the company identifier list. Likewise, any shortened forms not previously found in the list may be also be added to the company identifier list.

Thereafter, processing continues at block 302 where the now-updated company identifier list is employed by the same at least two CNRCs. Again, this is done because a company name occurrence identified by one of the CNRCs may provide additional information that allows one or more of the other CNRCs to identify additional occurrences of company names in the body of text. The processing of blocks 302-308 will continue so long as each repeated cycle of analysis at block 302 results in additional company name occurrences and, consequently, updates to the company identifier list.

When a determination is made at block 304 that no further company name occurrences have been identified, processing optionally continues at block 310 where a determination is made if any of the company name occurrences thus identified are found in a list of excluded company names. For example, phrase like "Parent Company," "Child Company," "Acquiring Company," etc. are often used for definitional purposes in agreements and thus are not recognized as company names. Additionally, organizations may define exclusions to match their particular style or template. For example, a law firm may always generically use the term "First Party Company" and therefore would want it excluded. If one or more of the identified company name occurrences is excluded, all instances of that occurrence are no longer categorized as a company name within the document.

Figure 8:
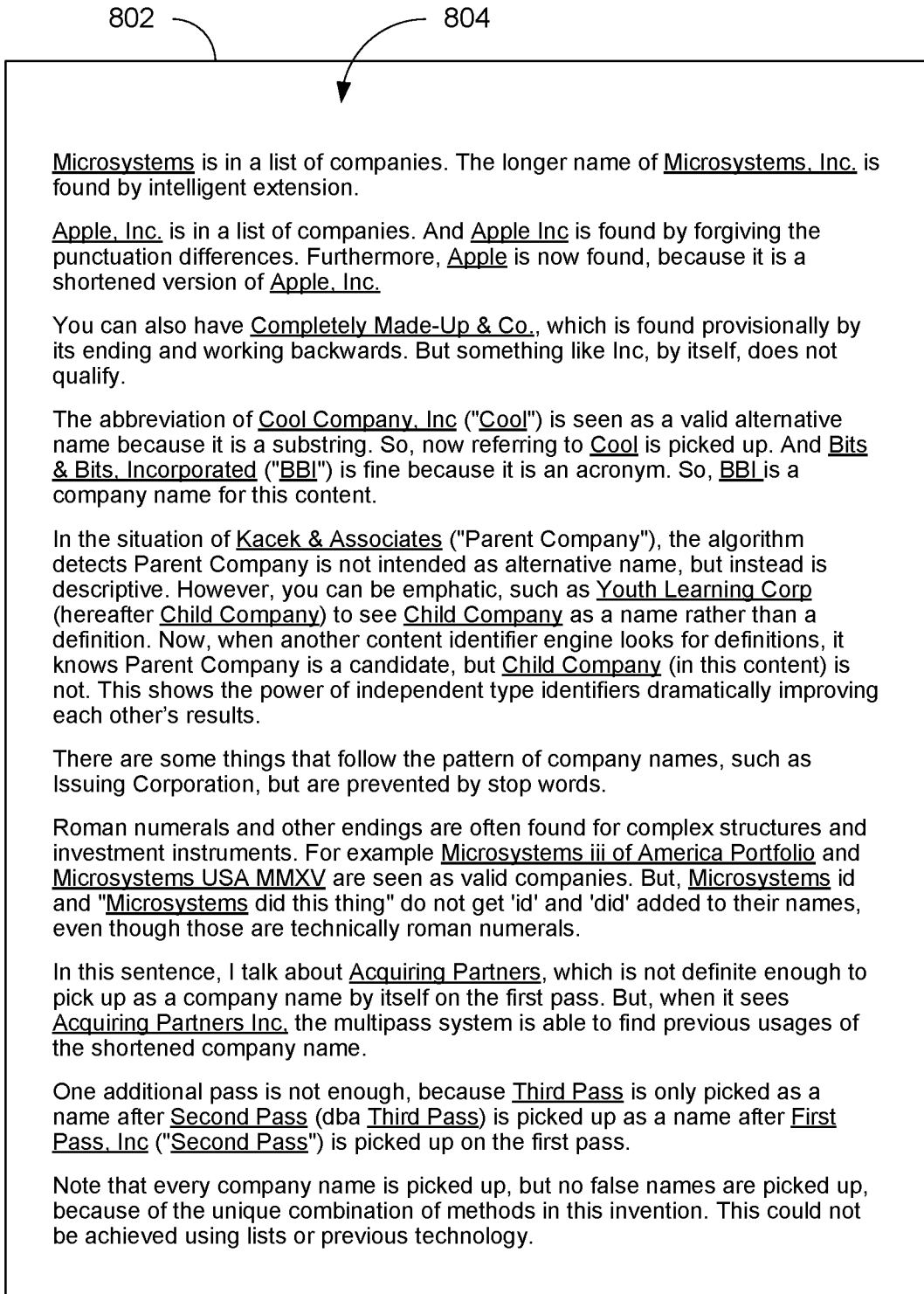
FIG. 8 is an illustration of an example of a user interface in accordance with the instant disclosure.

Regardless whether any occurrences were excluded at block 310, processing continues at block 312 where a user interface is generated, which user interface includes a representation of the at least one company name occurrence identified during the processing of blocks 302-308 and not otherwise excluded during the optional processing of block 310. In an embodiment, the user interface may include at least a portion of the body of text, such as a number of paragraphs or a section of the text that can be displayed on a display. Within the displayed portion of the text, indicia corresponding to any company name occurrences within that portion of the text are also displayed. An example of a user interface 802 in accordance with this embodiment is further illustrated in FIG. 8. As shown, the user interface 802 comprises a portion of text 804 in which the various company name occurrences for that portion of the text are highlighted through underlining provided in the text. As will be appreciated by those of skill in the art, various other techniques to highlight or otherwise indicate the presence of an identified company name in the text may be employed, e.g., different text or background colors, font sizes, font styles or combinations thereof.

Figure 4:
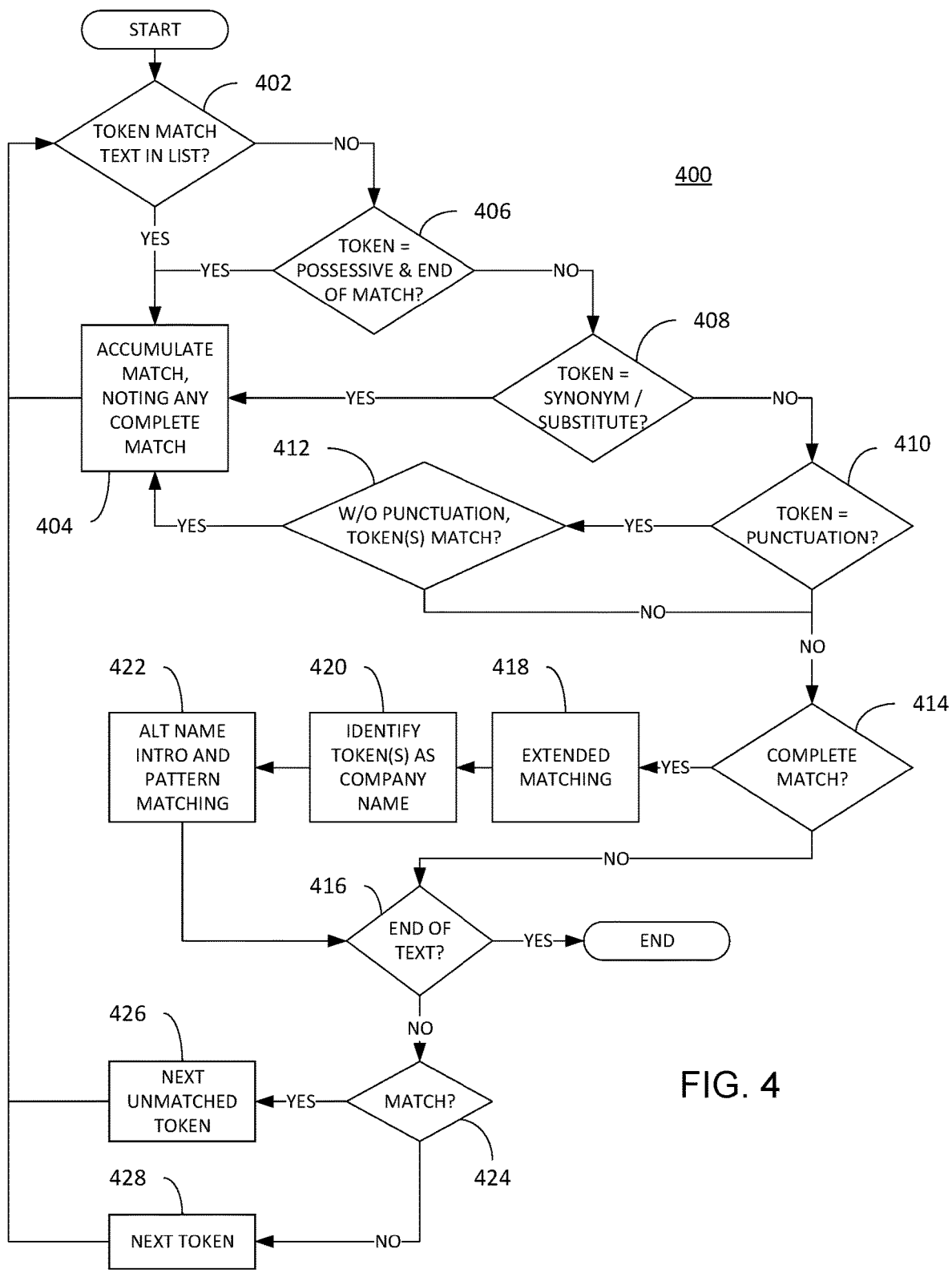
FIG. 4 is a flowchart illustrating processing performed by a first embodiment of a company name recognition component in accordance with the instant disclosure.

Referring now to FIG. 4, processing 400 performed by a first embodiment of a CNRC in accordance with the instant disclosure is further described. In particular, the processing 400 illustrated in FIG. 4 is based on matching portions (one or more tokens) of the body of text with any company names set forth in the company identifier list. At the beginning of the process 400, a first token in the sequence of tokens constituting the body of text is accessed and compared with company names in the company identifier list at block 402. In a presently preferred embodiment, the company names in the company identifier list are stored within a tree structure that supports multiple children and leaf indicators, as known in the art. As additional sequentially ordered tokens are considered, the tree structure is traversed by additional matching tokens until a leaf of the tree structure is reached (indicating a complete match of a company name) or a non-matching token for the currently traversed branch of the tree is found (indicating no match). Thus, if a given token at block 402 starts or continues a match with a portion of the tree structure, processing continues at block 404 where the considered token is "accumulated" as a potential now match or the continuation of previously started match. Thus, the processing of blocks 402 and 404 is repeated so long as the newly considered tokens continue to traverse the tree structure.

However, if a newly considered token at block 402 does not start or continue a match, processing continues at block 406 where it is determined whether the considered token is a possessive form that otherwise completes a match, i.e., a leaf node is reached if one "forgives" the occurrence of the possessive form. For example, if "Smith Law Office" is the tree structure being matched, occurrence of "Smith Law Office's practice" will still match the company name by ignoring the "'s." If the inquiry of block 406 is answered in the affirmative, processing continues at block 404 where the complete match is noted (e.g., the matched company name is noted for the accumulated tokens, which are likewise categorized an occurrence of a company name) and processing continues with the next sequential token in the text. Otherwise, processing continues at block 408 where it is determined if the currently accumulated tokens are an acceptable synonym or substitute of the company name represented by the traversed portion of the tree structure. For example, if "Saint"/"St." and "Department"/"Dept" are considered acceptable synonyms/substitutes pairs, then the phrase "Famous St. Louis Department Store" matches "Famous Saint Louis Dept Store." If the inquiry of block 408 is answered in the affirmative, processing once again proceeds to block 404 where the complete match is noted. If not, processing continues at block 410 where it is determined whether the mismatched token is punctuation such as a comma, ampersand, period, or hyphen. If so, block 412 is reached where a determination is made if the accumulated tokens, without the presence of the punctuation, constitute a complete or continuing match. If the answer at block 412 is yes, then processing once again proceeds to block 404 where the complete match is noted. In this manner, the tendency to leave out punctuation in company names in document text is essentially forgiven. For example, "Apple Inc" in the target content is allowed to match "Apple, Inc." in the company identifier list. However, the converse is not true: added punctuation in the body of text not otherwise present in the company identifier list is not forgiven. For example, "Brooks, Brothers" in the body of text is not allowed to match "Brooks Brothers" in the company identifier list.

If not the inquiries of either block 410 or 412 are answered in the negative, processing continues at block 414 to determine if a complete match had been previously noted at block 404. If so, processing continues at blocks 418-422 where efforts are made to determine if the completed match is part of a potential larger match or indicative of the presence of an additional company name occurrence nearby. Thus, at block 418, extended matching processing, more fully described with reference to FIG. 5 below, is performed to see if the completed match can be otherwise extended. In an embodiment, a longer successful match has priority over a shorter match.

Regardless whether the completed match is extended at block 418, whatever tokens have been identified at block 420 as a company name (either by virtue of a match in the company identifier list or extension of such a match) are categorized as a company name occurrence. Thereafter, processing continues at block 422 where a determination is made whether that company name occurrence also serves as an "introduction" to an additional company name occurrence. Processing in accordance with block 422 is more fully described with reference to FIG. 7 below. Once again, it is noted that the processing of block 422, though a constituent of the processing of FIG. 4, may also be treated as a standalone CNRC to be performed in parallel with the processing of FIG. 4.

Upon completion of the additional processing of blocks 418-422, or upon a negative answer to the query of block 414 (i.e., a complete match has not yet been found), processing continues at block 416 to see if the end of the text has been reached. If so, the process terminates. Otherwise, processing continues and once again inquires, at block 424, whether a complete match has been previously indicated (since it is unknown at block 424, given the convention of FIG. 4, if the processing previously traversed the negative branches of blocks 414 and 416 or the additional processing of blocks 418-422). If complete match has not been previously indicated, processing continues at block 428 where the next sequential token (relative to the most recently considered token at block 402) is identified and thereafter processed beginning at block 402 as described above. Otherwise, if a match has been indicated (extended or otherwise), processing continues at block 426 where the next sequential token immediately following the indicated match is identified and thereafter processed beginning at block 402 as described above.

Figure 5:
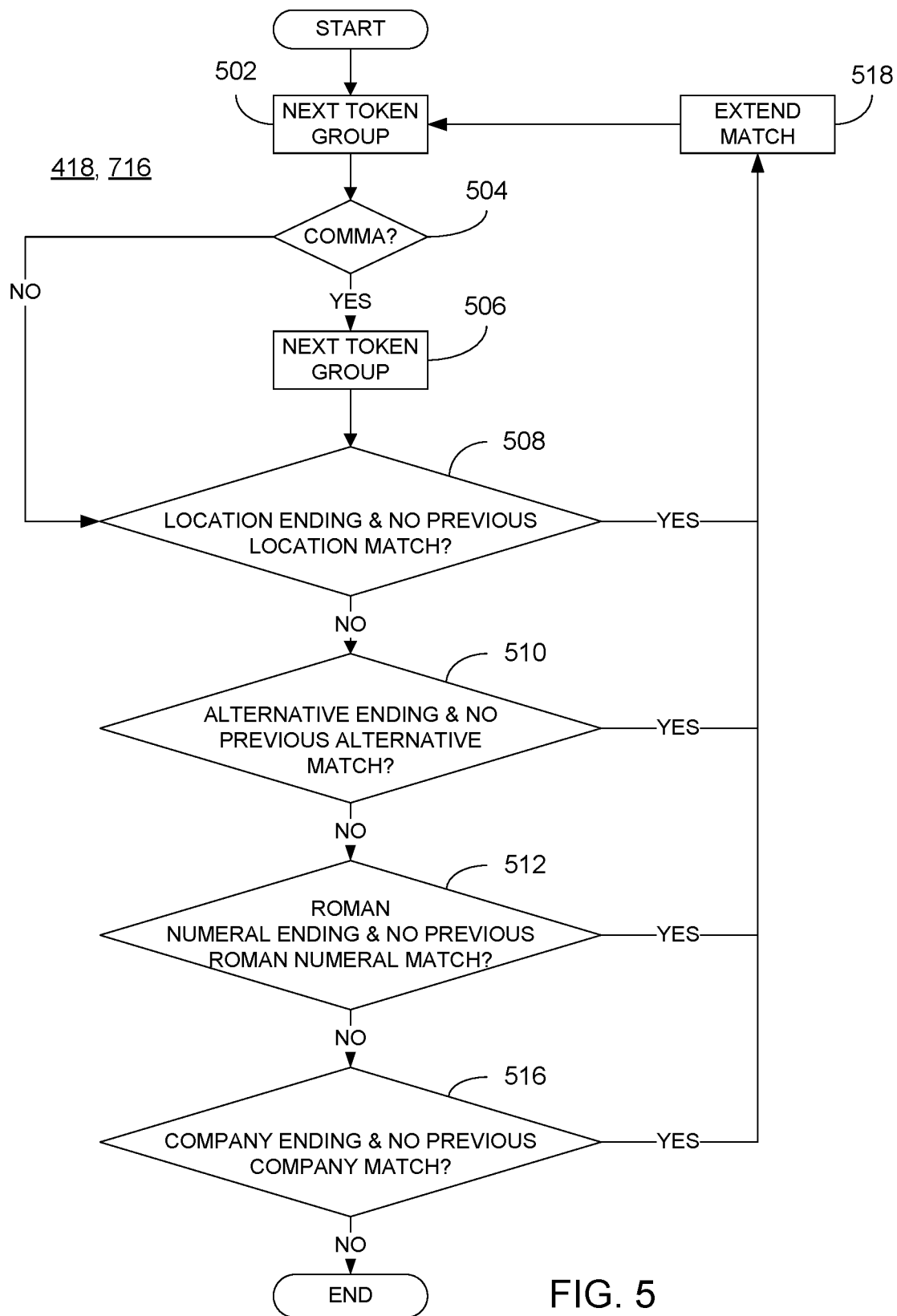
FIG. 5 is a flowchart illustrating extended matching processing that may be performed as part of the first embodiment or a third embodiment of a company name recognition component in accordance with the instant disclosure.

Referring now to FIG. 5, extended matching processing 418, 716 performed by either the first embodiment of a CNRC (FIG. 4) or a third embodiment of CNRC (FIG. 7) in accordance with the instant disclosure is further described. That is, as indicated by the reference numerals 418 and 716, the processing illustrated in FIG. 5 may be performed either as part of the processing of FIG. 4 (block 418) or FIG. 7 (block 716) described in greater detail below. Regardless, the processing 418, 716 illustrated in FIG. 5 is based on matching portions (one or more tokens) of the body of text following and being indicative of a company name occurrence. At the beginning of the process 418, 716, a first token in a sequence of tokens constituting a portion of the body of text following a previously identified company name occurrence is accessed at block 502. As used in the processing of FIG. 5, a token is considered to be either punctuation or a character string. Thus, a determination is made, at block 504, whether the accessed token is a comma, which may be the case, for example, where the company name "Microsystems" may be followed by a comma as in the occurrence of "Microsystems, Inc." If a comma is identified at block 504, it is effectively ignored by proceeding to the next token at block 506. Regardless, processing continues in either case at block 508 where a determination is made whether the current token matches any of a number of known location endings that are indicative of a company name. Such location endings may be stored in the company identifier list and may include specific location identifiers often found following a company name such as, by way of non-limiting example, "Asia," "USA," "Illinois," etc. Thus, for example, an occurrence of "USA" may signal a larger company name such as "Microsystems USA." If this is the first match of a location ending (because it is unlikely that two different location endings would be used in this case, e.g., "Microsystems USA Illinois" is unlikely to occur) for this iteration of the processing of FIG. 5, then block 518 is reached where the matched location ending is added as an extension to the previously identified company name occurrence, after which the next sequential token following the now-extended match is accessed. Note that previous identification of an alternative ending (block 510), a roman numeral ending (block 512) or a company ending (block 516) does not prevent the further extension of a previously identified or extended match by the addition of the location ending.

If a location ending is not identified at block 508, processing continues at block 510 where a determination is made whether the current token matches any of a number of known alternative endings that are indicative of a company name. Such alternative endings may be stored in the company identifier list and may include specific alternative identifiers often found following a company name such as, by way of non-limiting example, "Partners," "Portfolio," etc. Thus, for example, an occurrence of "Portfolio" may signal a larger company name such as "Newco Portfolio III." If this is the first match of an alternative ending for this iteration of the processing of FIG. 5, then block 518 is reached where the matched alternative ending is added as an extension to the previously identified company name occurrence, after which the next sequential token following the now-extended match is accessed. Note that previous identification of a location ending (block 508), a roman numeral ending (block 512) or a company ending (block 516) does not prevent the further extension of a previously identified or extended match by the addition of the alternative ending.

If an alternative ending is not identified at block 510, processing continues at block 512 where a determination is made whether the current token matches any of a number of known roman numeral endings that are indicative of a company name. Such alternative endings may be stored in the company identifier list and may include specific roman numerals often found following a company name such as, by way of non-limiting example, "I," "XI," etc. Thus, for example, an occurrence of "III" may signal a larger company name such as "Newco Portfolio III." However, in an embodiment, roman numerals that may otherwise be confused with actual words or abbreviations, e.g., "id" or "did," may be excluded for purposes of this analysis even though they are technically valid roman numerals. Regardless, if this is the first match of a roman numeral ending for this iteration of the processing of FIG. 5, then block 518 is reached where the matched roman numeral ending is added as an extension to the previously identified company name occurrence, after which the next sequential token following the now-extended match is accessed. Note that previous identification of a location ending (block 508), an alternative ending (block 510) or a company ending (block 516) does not prevent the further extension of a previously identified or extended match by the addition of the roman numeral ending.

Finally, if roman numeral ending is not identified at block 512, processing continues at block 516 where a determination is made whether the current token matches any of a number of known company endings that are indicative of a company name. Such alternative endings may be stored in the company identifier list and may include specific character strings often found following a company name such as, by way of non-limiting example, "Inc.," "Co.," "GmbH," etc. Thus, for example, an occurrence of "Inc." may signal a larger company name such as "Microsystems Inc." Regardless, if this is the first match of a company ending for this iteration of the processing of FIG. 5, then block 518 is reached where the matched company ending is added as an extension to the previously identified company name occurrence, after which the next sequential token following the now-extended match is accessed. Note that previous identification of a location ending (block 508), an alternative ending (block 510) or a roman numeral ending (block 512) does not prevent the further extension of a previously identified or extended match by the addition of the company ending.

If none of the conditions of blocks 508-516 are met, then the process terminates. If any extended matches were established, they are returned to the CNRC processing that instantiated the processing of FIG. 5.

Figure 6:
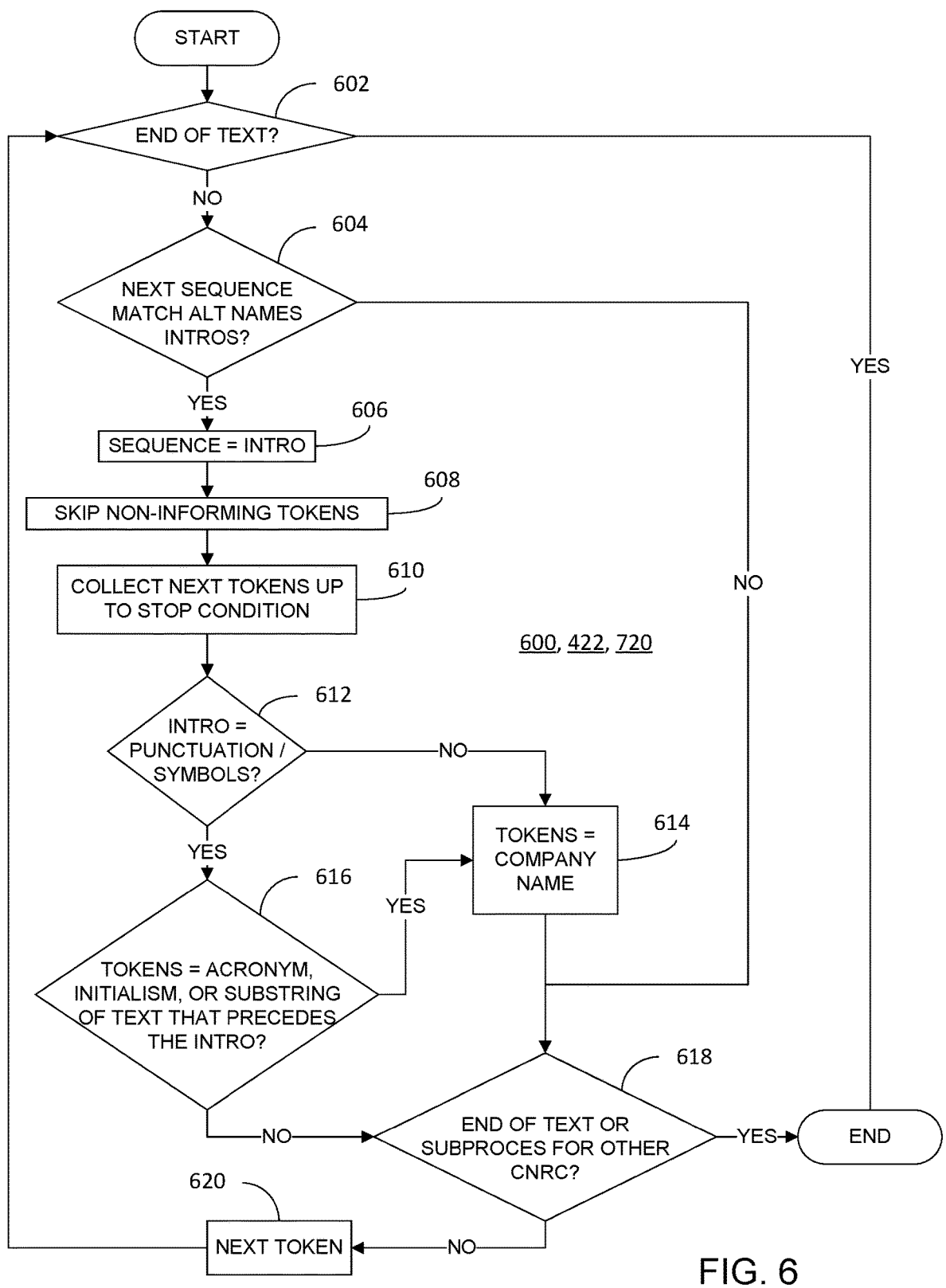
FIG. 6 is a flowchart illustrating processing performed by a second embodiment of a company name recognition component in accordance with the instant disclosure.

Referring now to FIG. 6, processing 600 performed by a second embodiment of a CNRC in accordance with the instant disclosure is further described. In particular, the processing 600 illustrated in FIG. 6 is based on matching portions (one or more tokens) of the body of text that precede and are indicative of a company name. As indicated by the reference numerals 422 and 720, the processing illustrated in FIG. 6 may be performed either as standalone process 600 or as part of the processing of FIG. 4 (block 422) or FIG. 7 (block 720) described in greater detail below. When incorporated into the processing of claim FIGS. 4 and 7, the processing of FIG. 6 is invoked to determine if a company name occurrence resulting from that processing also serves as an "introduction" to an additional company name occurrence. For example, "Zero Shoe Company (hereafter "Zero")" indicates that the word "Zero" is alternative company name corresponding to the company name occurrence "Zero Shoe Company."

Regardless, processing 600, 422, 720 begins at block 602 to determine if the end of the body of text has been reached. If not, processing continues at block 604 where a first sequential token in a body of text (or a first token following a company name occurrence) is assessed to determine whether it matches any of a number of alternative company name introductions that may be stored, for example, in the company identifier list. As used in the processing of FIG. 6, a token or sequence is considered to be a character string comprising one or more characters. For example, such alternative company name introductions may comprise phrases such as "hereafter", "doing business as," "dba," etc., or a punctuation or symbols such as an opening bracket, quote or parenthesis. If the sequence does not match any of the alternative company name introductions, then processing continues at block 618 where a determination is made whether the end of the text has been reached (in the case of standalone processing 600) or if the current iteration of the processing of FIG. 6 was instantiated by another CNRC (e.g., FIG. 4 or FIG. 7). If so, then processing is terminated since there is no further text to process in the former case or, in the latter case, that no indication was found that the company name occurrence was followed by any alternative company name introduction.

If, however, the determination of block 604 is answered in the affirmative, meaning that the sequence under consideration matched an alternative company name introduction, then processing continues at block 606 where the sequence under consideration is deemed to be a potential introduction to an additional company name occurrence. At block 608, certain non-informing tokens that often follow an introduction are identified so that they may skipped for further analysis purposes. For example, the word "hereafter" is considered an introduction. However, in the case of "hereafter: the "Cook Co." the occurrence of the colon, the word "the" and the quotation marks may be ignored because of the high probability that those characters/symbols will not form a part of a company name. Regardless, processing thereafter continues at block 610 where tokens sequentially following the matched alternative company name introduction are collected until a stop condition, such as an end bracket, an end quote, an end parenthesis, a lowercase word, a tab character, an end of line character or the like, is encountered.

Thereafter, at block 612, a determination is made if the matched alternative company name introduction was punctuation or a symbol as noted above. If not (meaning that one of the introductory phrases was matched instead) processing continues at block 614 where the collected tokens (from block 610) are deemed to be an alternative form of a company name. That is, those tokens following an occurrence of a strong indicator such as "hereafter" or "doing business as" have a high likelihood of being an alternative form of a company name. For example, in the case of "This company is doing business as Testco," "Testco" would be considered an alternative company name because the introductory phrase "doing business as" is considered a strong criterion. But, in the case of "Here is a word ('Testco')," "Testco" would not be considered an alternative company name because it does not immediately follow an already matched name and parentheses-quotes is considered weak. However, in the case of "Test Co. ('Testco')," "Testco" would be considered an alternative company name because it follows an already matched name, "Test Co.," which makes up for the weakness of the parentheses quotes. Regardless, following block 614, processing continues at block 618 as described above.

On the other hand, if matched alternative company name introduction did comprise punctuation or symbols at block 612, processing continues at block 616 where a determination is made whether the tokens collected at block 610 comprise an acronym, initialism or substring of the text that proceeded the intro. As an example, for the name "Foobar Bits & Bytes (name)", the opening parenthesis serves as only a weak potential introduction that the name in the parentheses is an alternative company name and the check of block 616 serves as a stronger check that the tokens following the introduction are, in fact, an alternative company name. Thus, in order for the name following the opening parenthesis to be considered an alternative company name, that name must either be an abbreviation ("Foo"), acronym/initialism ("FBB"), or match at least one word or substring ("Bits Company"). Thus, the case of "Foobar Bits & Bytes (Parent Company)" would result in a negative outcome at block 616 because "Parent Company" is seen to be a term definition as opposed to an alternate name for the company.

As shown, if the determination at block 618 concludes that the end of the text has not been reached or that the current iteration of the processing of FIG. 6 was not instantiated by another CNRC, then processing continues at block 620 where the next token in the sequence of body text tokens is accessed prior to proceeding back to step 602, as described above.

Figure 7:
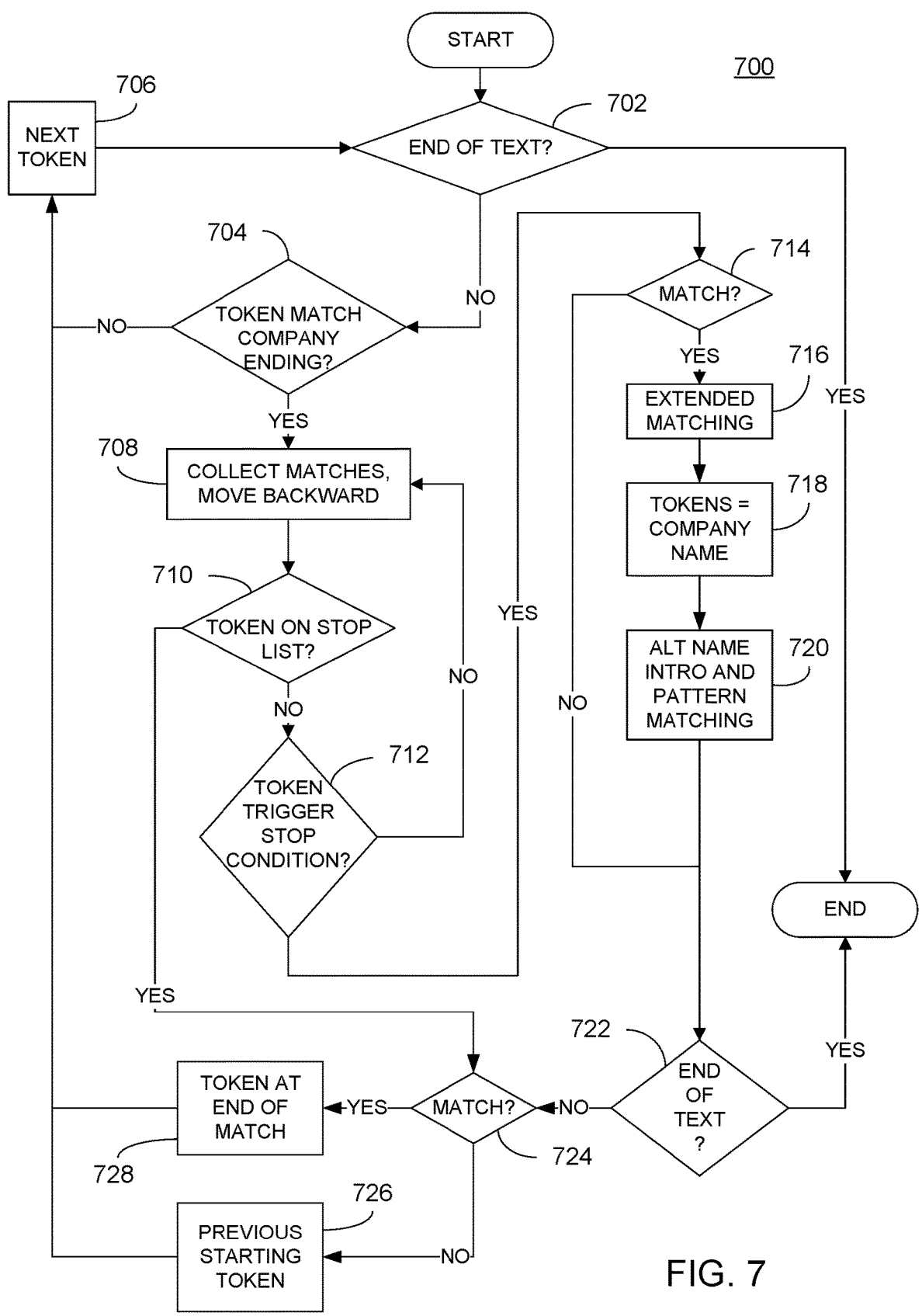
FIG. 7 is a flowchart illustrating processing performed by the third embodiment of a company name recognition component in accordance with the instant disclosure.

Referring now to FIG. 7, processing 700 performed by a third embodiment of a CNRC in accordance with the instant disclosure is further described. In particular, the processing 700 illustrated in FIG. 6 is based on matching portions (one or more tokens) of the body of text that follow and are indicative of a company name, i.e., company endings as discussed above relative to block 516 in FIG. 5. To avoid false positives, the strings used for this purpose each have a strength threshold to indicate whether a company ending may be used to algorithmically discover company name occurrences not otherwise found by the other CNRCs. For example, "Inc" is a strong indicator that the preceding text is a company name, but "Company" is not because "Company" is often used in a general sense, such as in the case of "the Acquiring Company."

Regardless, processing 700 begins at block 702 to determine if the end of the body of text has been reached. If not, processing continues at block 704 where a first sequential token in the body of text matches with a company ending (which may be stored in the company identifier list). If not, processing continues at block 704 where the next sequential token is accessed, and the processing of blocks 702 and 704 is repeated until such time that a token matching a company ending is identified or the end of the body of text is reached, thus terminating the process.

When the token at hand matches a company ending, processing continues at block 708 where tokens prior to the matched company ending are collected one at time. At block 710, the most recently collected token is assessed to see if it matches anything in a stop list, which may include transition or introductory words such as "if," "when," "lastly," etc. If not, processing continues at block 712 to see if the most recently collected token triggers a stop condition, such as encountering a lowercase word (unless the lowercase word is a permitted exception), another company ending in the company identifier listing, or certain permitted punctuation. For example, exclamation points, question marks, colons and semi-colons are stop conditions, whereas hyphens and the "&" symbol are conditionally acceptable as in the case of "David & Rachel Inc." If such a stop trigger is not encountered, processing continues one again at block 708 where additional tokens are collected as described above. If a stop trigger is encountered, processing continues at block 714 where it is determined if the collected tokens establish a match to a company name. If no match is identified at block 714, processing continues at block 722 to see if the end of the body of text has been reached. For example, backwards traverse of the phrase "Specifically, Company will start with collection of the tokens for "Company" followed by conditional collection of the comma. Because the collected tokens ", Company" assessed at block 714 will not establish a match, processing of the remain text ensues.

However, if a match is indicated at block 714, then extended matching processing (in accordance with FIG. 5) is performed and any match, extended or otherwise, are thereafter identified as a company name occurrence. Furthermore, processing continues at block 720 where the further processing of FIG. 6 is performed to see if the company name occurrence serves as an introduction to yet another company name occurrence.

If a collected token from block 708 is found in a stop list at block 710, or if the end of the body of text has not yet been reached at block 722, processing continues at block 724 where it is determined if any of the previous processing resulted in a match. If not, the previous starting token at block 704 is once again accessed such that the subsequent processing at block 706 results in the next sequential token being considered. Alternatively, if a match was identified, then the last token in the match is accessed at block 728 such that subsequent processing at block 706 results in the next sequential token following the match being considered.

While particular preferred embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

What is claimed is:

1. A method for performing, by at least one processing device, automated document analysis of a document comprising a body of text, the method comprising:
   accessing a token among a sequence of tokens constituting the body of the text in the document;
   comparing the token with company names included in a company identifier list;
   determining, based on the comparison, a potential match between the token and at least one company name in the company identifier list;
   analyzing, based on a determination of no match, whether the token constitutes a possessive form of the at least one company name;
   determining, based on a determination of no match, whether the token is a synonym or a substitute of the at least one company name;
   further determining, based on a determination of no match, whether the token includes a punctuation included in the at least one company name; and
   establishing a match with the at least one company name when the token constitutes at least one of a possessive form, a synonym, a substitute, or a punctuation.

2. The method of claim 1, further comprising:
   determining that the token constitutes a possessive form of the at least one company name; and
   indicating, based on an identification, a determination of a match.

3. The method of claim 1, further comprising:
   determining that the token is a synonym or a substitute of the at least one company name; and
   indicating, based on an identification, a determination of a match.

4. The method of claim 1, further comprising
   determining that the token includes a punctuation included in the at least one company name; and
   indicating, based on an identification, a determination of a match.

5. The method of claim 1, further comprising:
   categorizing, based on the match, the token according to the at least one company name.

6. The method of claim 1, further comprising:
   determining if the match is part of a potential larger match or indicative of a presence of an additional company name occurrence nearby.

7. The method of claim 1, further comprising:
   determining whether the at least one company name indicates an additional company name occurrence.

8. A system comprising:
   at least one processing device; and
   memory operatively connected to the at least one processing device, the memory comprising executable instructions that when executed by the at least one processing device cause the at least one processing device to:
   access a token among a sequence of tokens constituting a body of a text in a document;
   compare the token with company names included in a company identifier list;
   determine, based on the comparison, a potential match between the token and at least one company name in the company identifier list;
   analyze, based on a determination of no match, whether the token constitutes a possessive form of the at least one company name;

determine, based on a determination of no match, whether the token is a synonym or a substitute of the at least one company name;

further determine, based on a determination of no match, whether the token includes a punctuation included in the at least one company name; and establish a match with the at least one company name when the token constitutes at least one of a possessive form, a synonym, a substitute, or a punctuation.

9. The system of claim 8, further comprising executable instructions that, when executed by the at least one processing device, cause the at least one processing device to:

determine that the token constitutes a possessive form of the at least one company name; and indicate, based on an identification, a determination of a match.

10. The system of claim 8, further comprising executable instructions that, when executed by the at least one processing device, cause the at least one processing device to:

determine that the token is a synonym or a substitute of the at least one company name; and indicate, based on an identification, a determination of a match.

11. The system of claim 8, further comprising executable instructions that, when executed by the at least one processing device, cause the at least one processing device to:

determine that the token includes a punctuation included in the at least one company name; and indicate, based on an identification, a determination of a match.

12. The system of claim 8, further comprising executable instructions that, when executed by the at least one processing device, cause the at least one processing device to:

categorize, based on the match, the token according to the at least one company name.

13. The system of claim 8, further comprising executable instructions that, when executed by the at least one processing device, cause the at least one processing device to:

determine that the match is part of a potential larger match or indicative of a presence of an additional company name occurrence nearby.

14. The system of claim 8, further comprising executable instructions that, when executed by the at least one processing device, cause the at least one processing device to:

determine whether the at least one company name indicates an additional company name occurrence.

15. A non-transitory computer readable medium comprising executable instructions that when executed by at least one processing device cause the at least one processing device to perform automated document analysis of a document comprising a body of text in which the at least one processing device is caused to:

access a token among a sequence of tokens constituting the body of the text in the document;

compare the token with company names included in a company identifier list;

determine, based on the comparison, a potential match between the token and at least one company name in the company identifier list;

analyze, based on a determination of no match, whether the token constitutes a possessive form of the at least one company name;

determine, based on a determination of no match, whether the token is a synonym or a substitute of the at least one company name;

further determine, based on a determination of no match, whether the token includes a punctuation included in the at least one company name; and establish a match with the at least one company name when the token constitutes at least one of a possessive form, a synonym, a substitute, or a punctuation.

16. The non-transitory computer readable medium of claim 15, wherein those executable instructions are further operative to:

determine that the token constitutes a possessive form of the at least one company name; and indicate, based on an identification, a determination of a match.

17. The non-transitory computer readable medium of claim 15, wherein those executable instructions are further operative:

to determine that the token is a synonym or a substitute of the at least one company name; and indicate, based on an identification, a determination of a match.

18. The non-transitory computer readable medium of claim 15, wherein those executable instructions are further operative to:

determine that the token includes a punctuation included in the at least one company name; and indicate, based on an identification, a determination of a match.

19. A method for performing, by at least one processing device, automated document analysis of a document comprising a body of text, the method comprising:

accessing a token among a sequence of tokens constituting the body of the text in the document;

comparing the token with company names included in a company identifier list;

determining, based on the comparison, a potential match between the token and at least one company name in the company identifier list;

analyzing, based on a determination of no match, whether the token constitutes a possessive form of the at least one company name;

determining, based on a determination of no match, whether the token is a synonym or a substitute of the at least one company name;

further determining, based on a determination of no match, whether the token includes a punctuation included in the at least one company name;

establishing a match with the at least one company name when the token constitutes at least one of a possessive form, a synonym or a substitute, and a punctuation;

determining if the match is part of a potential larger match or indicative of a presence of an additional company name occurrence nearby; and prioritizing, when the match is determined as part of a potential larger match, the potential larger match over the match.

20. A system comprising:

at least one processing device; and memory operatively connected to the at least one processing device, the memory comprising executable instructions that when executed by the at least one processing device cause the at least one processing device to:

access a token among a sequence of tokens constituting a body of a text in a document;

compare the token with company names included in a company identifier list;

determine, based on the comparison, a potential match between the token and at least one company name in the company identifier list;

analyze, based on a determination of no match, whether the token constitutes a possessive form of the at least one company name;

determine, based on a determination of no match, whether the token is a synonym or a substitute of the at least one company name;

further determine, based on a determination of no match, whether the token includes a punctuation included in the at least one company name;

establish a match with the at least one company name when the token constitutes at least one of a possessive form, a synonym or a substitute, and a punctuation;

determine that the match is part of a potential larger match or indicative of a presence of an additional company name occurrence nearby; and prioritize, responsive to a determination that the match is determined as part of a potential larger match, the potential larger match over the match.

\* \* \* \* \*

UNITED STATES PATENT AND TRADEMARK OFFICE
CERTIFICATE OF CORRECTION

PATENT NO. : 11,138,377 B2
APPLICATION NO. : 16/730122
DATED : October 5, 2021
INVENTOR(S) : Cook et al.

Page 1 of 1

It is certified that error appears in the above-identified patent and that said Letters Patent is hereby corrected as shown below:

On the Title Page

At Item (73) "Assignee", please delete "Freedin Solutions Group, LLC" and insert --Freedom Solutions Group, LLC-- therefor.

Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*